(12) United States Patent
Kim

(10) Patent No.: US 12,455,003 B2
(45) Date of Patent: Oct. 28, 2025

(54) TRANSMISSION

(71) Applicant: Hyundai Transys Inc., Seosan-si (KR)

(72) Inventor: Tae Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/293,074

(22) PCT Filed: Feb. 25, 2022

(86) PCT No.: PCT/KR2022/002752
§ 371 (c)(1),
(2) Date: Jan. 29, 2024

(87) PCT Pub. No.: WO2023/058830
PCT Pub. Date: Apr. 13, 2023

(65) Prior Publication Data
US 2025/0003480 A1    Jan. 2, 2025

(30) Foreign Application Priority Data
Oct. 6, 2021    (KR) .......................... 10-2021-0132601

(51) Int. Cl.
*F16H 57/00*    (2012.01)
*F16H 57/021*    (2012.01)
*F16H 57/04*    (2010.01)

(52) U.S. Cl.
CPC ....... *F16H 57/0423* (2013.01); *F16H 57/021* (2013.01)

(58) Field of Classification Search
CPC ........................... F16H 57/0423; F16H 57/021
See application file for complete search history.

(56) References Cited

U.S. PATENT DOCUMENTS

| | | | | |
|---|---|---|---|---|
| 4,467,670 | A * | 8/1984 | Kawamoto | F16H 37/022 475/210 |
| 8,840,511 | B2 * | 9/2014 | Seno | F16H 57/0423 184/6.12 |
| 10,655,725 | B2 * | 5/2020 | Kodama | F16H 57/043 |
| 12,078,238 | B2 * | 9/2024 | Nakawatari | F16H 57/0412 |
| 2013/0283972 | A1 * | 10/2013 | Yamamoto | F16H 57/0486 903/902 |
| 2019/0063586 | A1 | 2/2019 | Heeke et al. | |

FOREIGN PATENT DOCUMENTS

| | | |
|---|---|---|
| JP | 62-130254 U | 8/1987 |
| JP | 02-195059 A | 8/1990 |
| JP | 2004-124977 A | 4/2004 |
| JP | 2010031925 A | 2/2010 |
| JP | 5029100 B2 | 9/2012 |
| KR | 10-2009-0061947 A | 6/2009 |
| KR | 102238845 B1 | 4/2021 |

OTHER PUBLICATIONS

International Search Report dated Jun. 23, 2022 in International Application No. PCT/KR2022/002752.

* cited by examiner

*Primary Examiner* — Victor L MacArthur
(74) *Attorney, Agent, or Firm* — SALIWANCHIK, LLOYD & EISENSCHENK

(57) ABSTRACT

Proposed is a transmission including a casing unit, a housing unit coming into contact with the casing unit, an input shaft support integrally formed with the housing unit and having a lubricant flow path, a lubricant flowing through the lubricant flow path, and a coupling portion coupling the casing unit and the housing unit to each other.

5 Claims, 5 Drawing Sheets

TRANSMISSION

CROSS-REFERENCE TO RELATED APPLICATIONS

This application is the U.S. national stage application of International Patent Application No. PCT/KR2022/002752, filed Feb. 25, 2022, which claims the benefit under 35 U.S.C. § 119 of Korean Application No. 10-2021-0132601, filed Oct. 6, 2021, the disclosures of each of which are incorporated herein by reference in their entirety.

TECHNICAL FIELD

Exemplary embodiments relate to a transmission, and more particularly, to a transmission having a decreased number of components, thereby reducing the component costs and simplifying the component assembly process.

BACKGROUND ART

Usually, automatic transmissions, performing gear shifting, are each bolt-coupled to a casing and a housing. An input shaft support is bolt-coupled to the casing. At this point, the input shaft support is coupled, in the radial direction, to the casing, thereby being securely held and having a lubricant flow path.

However, the bolt-coupling of the input shaft support and the housing to the casing causes the problem of making a component assembly process complex.

In addition, when machining a lubricant flow path for an input shaft, machining is required to be performed on the housing from the outside inward. Therefore, a machining length is increased, and thus positional control is difficult to perform at the end portion for machining. Furthermore, a component, such as a cap or a ball, that blocks the end portion is necessary to stop the flow of a lubricant. However, a problem arises when a leak occurs because the leak causes the lubricant to flow outward.

Therefore, there is a need to find a solution to these problems.

The related art of the present disclosure is disclosed in Korean Patent No. 10-2238845 (entitled "POWER TRANSMISSION APPARATUS FOR HYBRID VEHICLE" and registered on Apr. 6, 2021).

DISCLOSURE

Technical Problem

An object of the present disclosure, which is contrived to address the above-mentioned problems, is to provide a transmission having a decreased number of components, thereby reducing the component costs and simplifying the component assembly process.

Technical Solution

In one embodiment, in order to accomplish the above-mentioned object, a transmission includes: a casing unit; a housing unit coming into contact with the casing unit; an input shaft support integrally formed with the housing unit and having a lubricant flow path, a lubricant flowing through the lubricant flow path; and a coupling portion coupling the casing unit and the housing unit to each other.

The input shaft support may be integrally formed with the housing unit in such a manner as to extend to one side from the housing unit.

With the coupling portion, the input shaft support may be coupled to the casing unit.

The casing unit may include: a first casing having a first casing coupling portion facing the housing unit, the coupling portion being coupled to the first casing coupling portion; and a second casing connected to the first casing.

The housing unit may include: a first housing having a first housing coupling portion facing the first casing coupling portion, the coupling portion being coupled to the first housing coupling portion; and a second housing formed to extend to one side from the first housing and integrally formed with the input shaft support.

The first casing may have a second coupling portion, the coupling portion being coupled to the second coupling portion, and the input shaft support may have an input shaft support connected to the second housing and facing the second casing coupling portion, the coupling portion being coupled to the input shaft support.

The input shaft support may include: a first input shaft support formed to extend to one side from the second housing, coming into contact with the first casing, and having the input shaft support coupling portion and a first lubricant flow path of the lubricant flow path; and a second input shaft support connected to the first input shaft support and having a second lubricant flow path of the lubricant flow path.

Advantageous Effects

In the transmission according to the embodiments of the present disclosure, the housing unit and the input shaft support are integrally formed into each other. Thus, the effect of not only reducing the component costs, but also increasing the rigidity and reducing vibration and noise can be achieved.

In addition, in the transmission according to the embodiments of the present disclosure, the housing unit and the input shaft support are integrally formed into each other. Accordingly, the full length of the transmission can be reduced. Furthermore, the number of components can be decreased when compared with the case in the related art where the housing unit and the input shaft support are each required to be coupled to the casing unit using the coupling portion. Thus, the effect of reducing the component costs can be achieved.

BEST MODE

Figure 1:
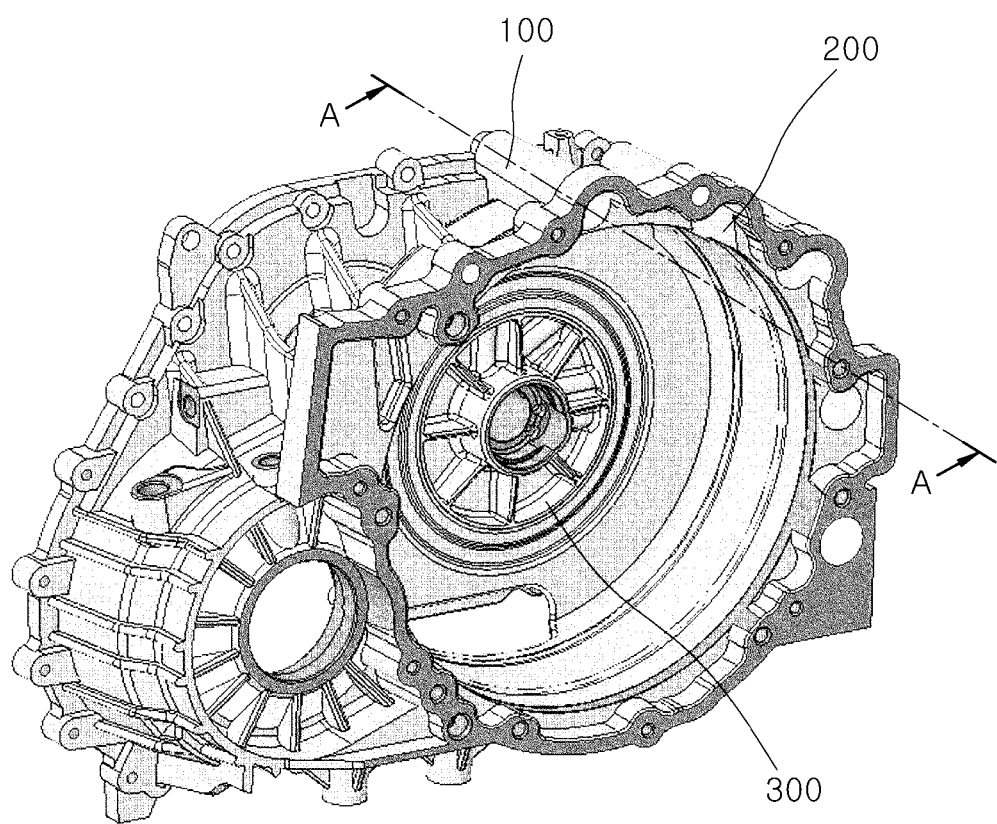
FIG. 1 is a view schematically illustrating a transmission according to an embodiment of the present disclosure.

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

A transmission 1 according to an embodiment of the present disclosure will be described below with reference to the accompanying drawings.

For clarity and convenience in description, thicknesses of lines, sizes of constituent elements, and the like may be illustrated in a non-exact proportion in the drawings. In addition, terms defined by considering the meanings thereof in the present disclosure will be used below and may vary according to the user's or manager's intention or according to practices in the art. Therefore, these terms should be contextually defined in light of the present specification.

Figure 2:
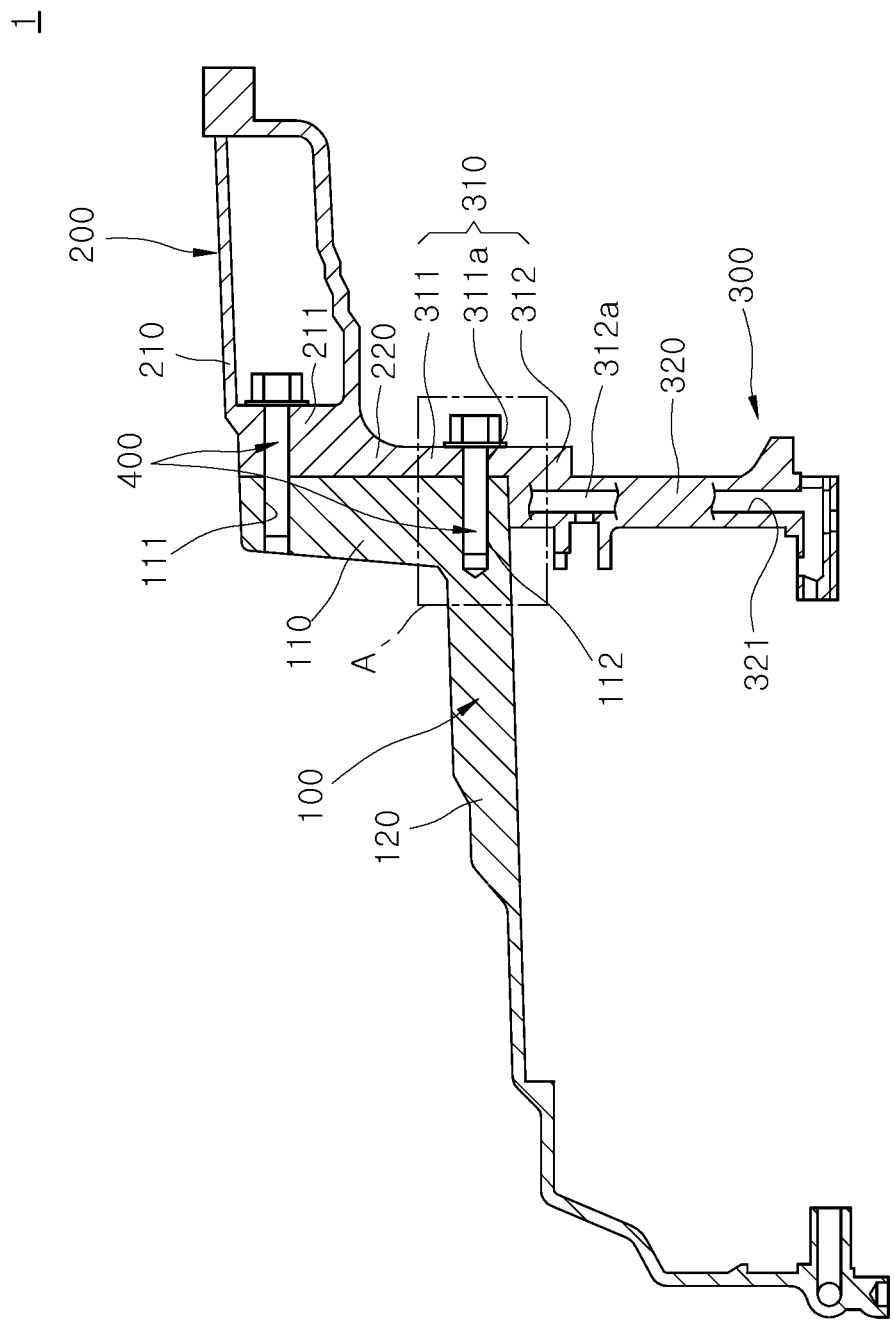
FIG. 2 is a cross-sectional view taken along line A-A' in FIG. 1.
Figure 3:
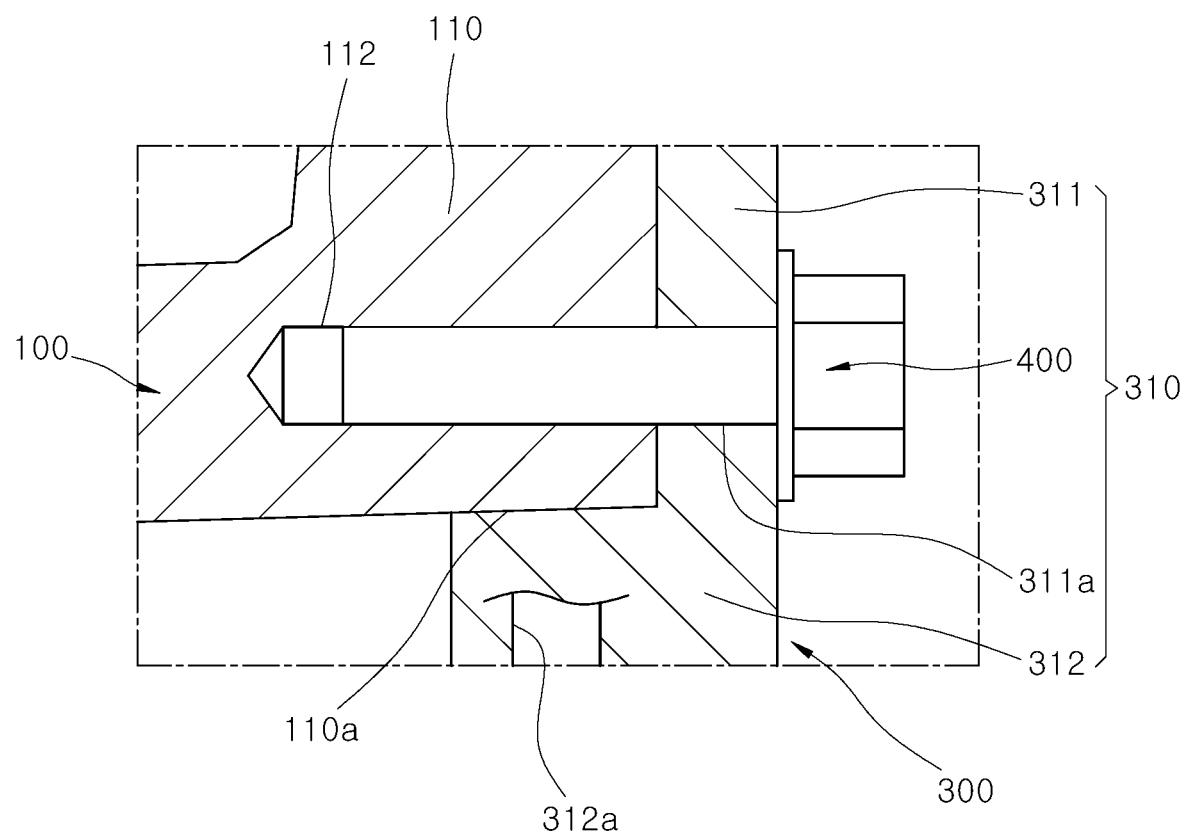
FIG. 3 is an enlarged view illustrating Portion A of FIG. 2.
Figure 4:
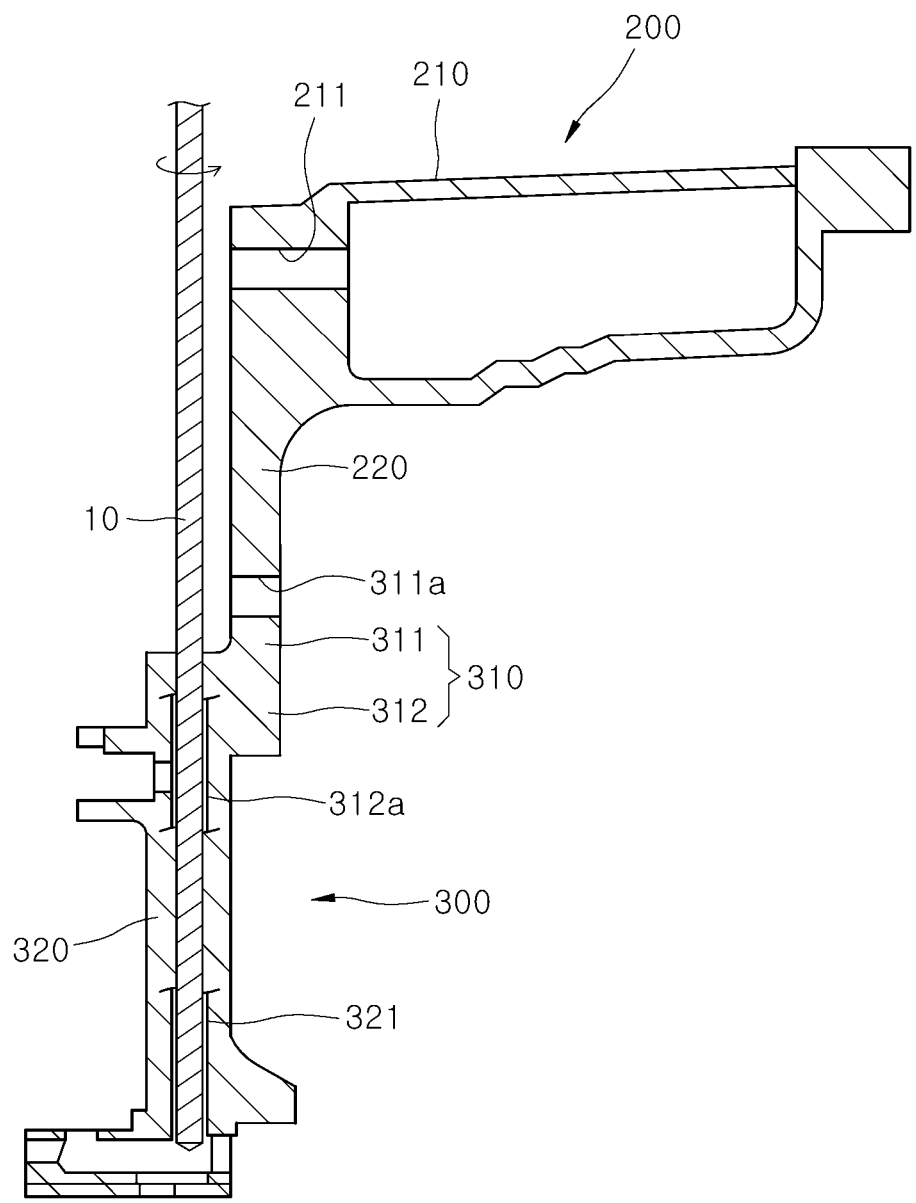
FIG. 4 is a view illustrating that a lubricant flow path is machined into an input shaft support of the transmission according to the embodiment of the present disclosure, using a machining apparatus.
Figure 5:
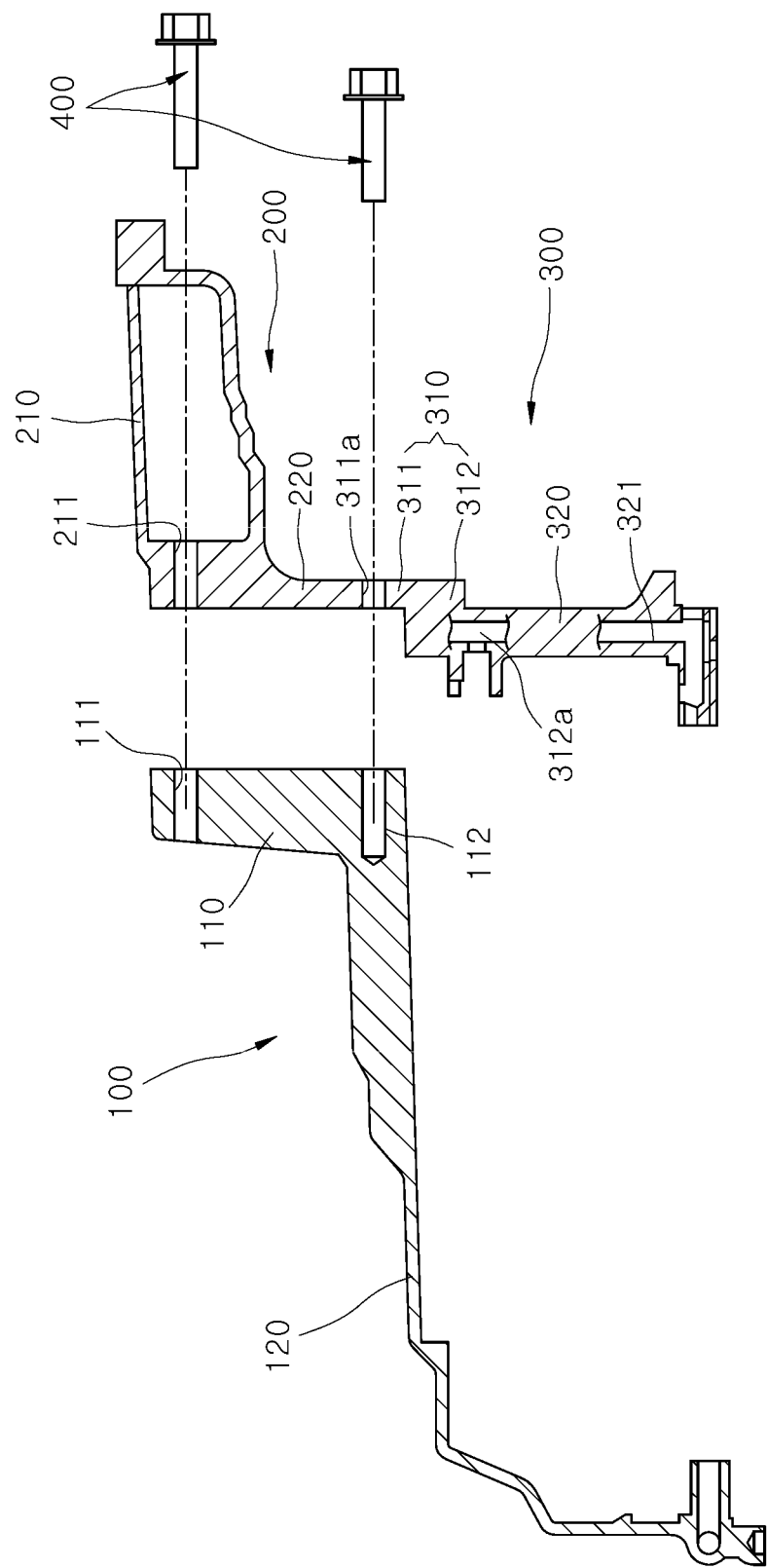
FIG. 5 is a view illustrating a process of assembling the transmission according to the embodiment of the present disclosure.

FIG. 1 is a view schematically illustrating the transmission 1 according to the embodiment of the present disclosure. FIG. 2 is a cross-sectional view taken along line A-A' in FIG. 1. FIG. 3 is an enlarged view illustrating Portion A of FIG. 2. FIG. 4 is a view illustrating that a lubricant flow path is machined into an input shaft support of the transmission 1 according to the embodiment of the present disclosure, using a machining apparatus. FIG. 5 is a view illustrating a process of assembling the transmission 1 according to the embodiment of the present disclosure.

With reference to FIGS. 1 to 5, the transmission 1 according to the present disclosure includes a casing unit 100, a housing unit 200, an input shaft support 300, and a coupling portion 400. A gear modular unit (not illustrated) and a clutch unit (not illustrated) may be installed within the casing unit 100. The gear modular unit and the clutch module transfer the motive power of a motor. Flow paths (not illustrated) through which a lubricant flows are provided in the gear modular unit and the clutch unit, respectively.

The casing unit 100 includes a first casing 110 and a second casing 120. The first casing 110 has a first casing coupling portion 111 which faces the housing unit 200 and to which the coupling portion 400 is coupled.

In this case, the first casing coupling portion 111 has the shape of a hole and is arranged to face a first housing coupling portion 211 of the housing unit 200 described below. A screw thread (not illustrated) may be formed on the internal surface of the first casing coupling portion 111 in such a manner that the coupling portion 400 is coupled to the first casing coupling portion 111 in a nut-bolt fastening manner.

The first casing 110 has a second casing coupling portion 112 to which the coupling portion 400 is coupled. The second casing coupling portion 112 has the shape of a groove and faces an input shaft support coupling portion 311a in the input shaft support 300. A screw thread (not illustrated) may be formed on the internal surface of a second housing coupling portion 221 in such a manner that the coupling portion 400 is coupled to the second housing coupling portion 221 in a nut-bolt fastening manner.

The second casing 120 is connected to the first casing 110. The second casing 120 has the shape of a cylinder and surrounds a motor unit (not illustrated) and an engine clutch (not illustrated).

The housing unit 200 comes into contact with the casing unit 100. The motor unit and the engine clutch may be installed within the housing unit 200. The housing unit 200 faces the casing unit 100 and comes into contact with the casing unit 100. At this point, in the housing unit 200, the engine clutch is supplied with motive power from the motor unit.

The housing unit 200 includes a first housing 210 and a second housing 220. The first housing 210 has a first housing coupling portion 211 to which the coupling portion 400 is coupled.

The first housing coupling portion 211 has the shape of a hole and faces the first casing coupling portion 111 in the first casing 110. A screw thread may be formed in the internal surface of the first housing coupling portion 211 in such a manner that the coupling portion 400 is coupled to the first housing coupling portion 211 in a nut-bolt fastening manner.

The second housing 220 is formed to extend to one side from the first housing 210 and is integrally formed with the input shaft support 300. At this point, the input shaft support 300 is integrally formed with the second housing 220 in such a manner as to extend to one side from the second housing 220.

The input shaft support 300 has the input shaft support coupling portion 311a which is connected to the second housing unit 220 and faces the second casing coupling portion 112 and to which the coupling portion 400 is coupled.

The input shaft support coupling portion 311a has the shape of a hole and faces the second casing coupling portion 112. A screw thread (not illustrated) may be formed on the internal surface of the input shaft support coupling portion 311a in such a manner that the coupling portion 400 is coupled to the input shaft support coupling portion 311a in a nut-bolt fastening manner.

The input shaft support 300 is integrally formed with the housing unit 200 and has first and second lubricant flow paths 312a and 321 through which a lubricant flows. In this case, the first and second lubricant flow paths 312a and 321 are connected to a flow path.

As illustrated in FIG. 2, the integral formation of the housing unit 200 and the input shaft support 300 can reduce the component costs, increase the rigidity and reduce vibration and noise. In addition, the full length of the transmission 1 can be reduced. Furthermore, the number of components can be decreased when compared with the case in the related art where the housing unit 200 and the input shaft support 300 are each required to be coupled to the casing unit 100 using the coupling portion 400.

The input shaft support 300 is integrally formed with the housing unit 200 in such a manner as to extend to one side from the housing unit 200. Accordingly, if the first and second lubricant flow paths 312a and 321 are machined into the input shaft support 300, the lubricant flow paths 312a and 321 can be readily machined into the input shaft support 300.

In addition, since the first and second lubricant flow paths 312a and 321 are machined into a portion of the transmission 1, a lubricant, even if a fine leak thereof occurs, can be inhibited from flowing out of the transmission 1.

The input shaft support 300 includes a first input shaft support 310 and a second input shaft support 320. The first input shaft support 310 is formed to extend to one side from the second housing 220 and comes into contact with the first casing 110.

At this point, a first input shaft support extension portion 312 of the first input shaft support 310 surrounds a contact surface 110a of the first casing 110 (refer to FIG. 3).

The first input shaft support 310 includes a first input shaft support main body 311 and the first input shaft support extension portion 312. The first input shaft support main body 311 is formed to extend to one side from the second housing 220 and has the input shaft support coupling portion 311a. the input shaft support coupling portion 311a in the first input shaft support 310 faces the second casing coupling portion 112 in the first casing 110.

The first input shaft support extension portion 312 is formed to extend to one side from the first input shaft support main body 311 and comes into contact with the first casing 110. At this point, the first input shaft support extension portion 312 is supported on the first casing 110.

Accordingly, the input shaft support 300 is securely supported, in the radial direction, that is, in the Y-axis direction, on the casing unit 100, and thus can support an input shaft (not illustrated) and the engine clutch in the radial direction, that is, the Y-axis direction.

A first lubricant flow path 312a through which the lubricant flows is formed in the first input shaft support extension portion 312. With a machining apparatus 10, such as a drill, the first lubricant flow path 312a may be formed, in the vertical direction (on FIG. 4) in the first input shaft support extension portion 312.

The second input shaft support 320 is connected to the first input shaft support 310 and has the second lubricant flow path 321. With the machining apparatus 10, such as a drill, the second lubricant flow path 321 may be formed, in the vertical direction (on FIG. 4) in the second input shaft support 320.

The coupling portion 400 couples the casing unit 100 and the housing unit 200 to each other. The coupling portion 400 is a bolt and couples the casing unit 100 and the housing unit 200 in a nut-bolt fastening manner. According to the present disclosure, the coupling portion 400 is described as a bolt, but not limited thereto. Various modifications can be made to the coupling portion 400, depending on a situation, as long as the coupling portion 400 passes through the casing unit 100 and the housing unit 200 and thus couples the casing unit 100 and the housing unit 200.

With the coupling portion 400, the input shaft support 300 is coupled to the casing unit 100. Specifically, the casing unit 100 and the housing unit 200 are coupled to each other using the coupling portion 400, and then, with the coupling portion 400, the input shaft support 300 can be further coupled to the casing unit 100. Accordingly, the housing unit 200 and the input shaft support 300 can be securely coupled to the casing unit 100.

As described above, in the transmission 1 according to the present disclosure, the housing unit 200 and the input shaft support 300 are integrally formed with each other. Thus, the component costs can be reduced. Furthermore, the rigidity can be increased, and vibration and noise can be reduced.

In addition, the full length of the transmission 1 is reduced. Furthermore, the number of components is decreased when compared with the case in the related art where the housing unit 200 and the input shaft support 300 are each required to be coupled to the casing unit 100 using the coupling portion 400. Thus, the component costs are reduced.

The embodiment of the present disclosure is described only in an exemplary manner with reference to the drawings. It will be apparent to a person of ordinary skill in the art to which the present disclosure pertains that various modifications and equivalents are possible from the description of the embodiment.

Therefore, the proper technical scope of the present disclosure should be defined by the following claims.

The invention claimed is:

1. A transmission comprising:
a casing unit that is configured to have a clutch unit disposed therein;
a housing unit in contact with the casing unit;
an input shaft support that is configured to support an input shaft, wherein the input shaft support is monolithically formed with the housing unit and comprises a lubricant flow path that is configured to receive a lubricant;
a first fastener coupling the casing unit and the housing unit to each other, wherein the first fastener is in direct physical contact with the casing unit and with the housing unit; and
a second fastener coupling the casing unit and the input shaft support to each other, wherein the second fastener is in direct physical contact with the casing unit and with the input shaft support,
wherein the input shaft support has an input shaft support coupling portion connected to the housing unit and coupled to the second fastener,
wherein the lubricant flow path comprises a first lubricant flow path and a second lubricant flow path, and
wherein the input shaft support comprises:
a first input shaft support extending away from the housing unit in a first direction that is parallel to an axial direction of the lubricant flow path, wherein the first input shaft support comes into contact with the casing unit, and wherein the first input shaft support comprises the input shaft support coupling portion and the first lubricant flow path; and
a second input shaft support connected to the first input shaft support, wherein the second input support shaft comprises the second lubricant flow path.

2. The transmission of claim 1, wherein the casing unit comprises:
a first casing having a first casing coupling portion facing the housing unit, the first fastener being coupled to the first casing coupling portion; and
a second casing connected to the first casing, and
wherein the first input shaft support comes into contact with the first casing.

3. The transmission of claim 2, wherein the housing unit comprises:
a first housing having a first housing coupling portion facing the first casing coupling portion, wherein the first fastener is coupled to the first housing coupling portion; and
a second housing extending away from the first housing, wherein the second housing is monolithically formed with the input shaft support, and
wherein the first input shaft support extends away from the second housing in the first direction.

4. The transmission of claim 3, wherein the second casing has a second casing coupling portion, wherein the second fastener is coupled to the second casing coupling portion, and wherein the input shaft support coupling portion is connected to the second housing and faces the second casing coupling portion.

5. A transmission comprising:
a casing unit that is configured to have a clutch unit disposed therein;
a housing unit in contact with the casing unit;
an input shaft support that is configured to support an input shaft, wherein the input shaft support is monolithically formed with the housing unit and comprises a lubricant flow path that is configured to receive a lubricant;
a first fastener coupling the casing unit and the housing unit to each other, wherein the first fastener is in direct physical contact with the casing unit and with the housing unit; and
a second fastener coupling the casing unit and the input shaft support to each other, wherein the second fastener is in direct physical contact with the casing unit and with the input shaft support,
wherein the input shaft support extends away from the housing unit in a first direction that is parallel to an axial direction of the lubricant flow path,
wherein the casing unit comprises:
 a first casing having a first casing coupling portion facing the housing unit, the first fastener being coupled to the first casing coupling portion; and
 a second casing connected to the first casing,
wherein the housing unit comprises:
 a first housing having a first housing coupling portion facing the first casing coupling portion, wherein the first fastener is coupled to the first housing coupling portion; and
 a second housing extending away from the first housing, wherein the second housing is monolithically formed with the input shaft support,
wherein the second casing has a second casing coupling portion, wherein the second fastener is coupled to the second casing coupling portion, wherein the input shaft support has an input shaft support coupling portion connected to the second housing and facing the second casing coupling portion, and wherein the second fastener is coupled to the input shaft support coupling portion,
wherein the lubricant flow path comprises a first lubricant flow path and a second lubricant flow path, and
wherein the input shaft support comprises:
 a first input shaft support extending away from the second housing in the first direction, wherein the first input shaft support comes into contact with the first casing, and wherein the first input shaft support comprises the input shaft support coupling portion and the first lubricant flow path; and
 a second input shaft support connected to the first input shaft support, wherein the second input support shaft comprises the second lubricant flow path.

* * * * *